US008354051B2

(12) United States Patent  
Feuilloley et al.

(10) Patent No.: US 8,354,051 B2  
(45) Date of Patent: Jan. 15, 2013

(54) METHOD AND INSTALLATION FOR THE PRODUCTION OF CONTAINERS

(75) Inventors: Guy Feuilloley, Octeville sur Mer (FR); Luc Desoutter, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 0 days.

(21) Appl. No.: 12/561,198

(22) Filed: Sep. 16, 2009

(65) Prior Publication Data

US 2010/0072673 A1 Mar. 25, 2010

Related U.S. Application Data

(63) Continuation of application No. 11/667,958, filed as application No. PCT/FR2005/002826 on Nov. 15, 2005, now abandoned.

(30) Foreign Application Priority Data

Nov. 22, 2004 (FR) ...................................... 04 12372

(51) Int. Cl.
  *B29C 49/68* (2006.01)
(52) U.S. Cl. .......................... 264/458; 264/454; 264/535
(58) Field of Classification Search .................. 264/454, 264/458, 535; 425/174.4, 526
  See application file for complete search history.

(56) References Cited

U.S. PATENT DOCUMENTS

| | | |
|---|---|---|
| 2,769,117 A | 10/1956 | Pirillo |
| 3,309,553 A | 3/1967 | Kroemer |
| 3,626,143 A | 12/1971 | Fry |
| 3,627,989 A | 12/1971 | Heidler |
| 3,640,671 A | 2/1972 | Reilly |
| 3,768,314 A | 10/1973 | Metzler et al. |
| 3,957,618 A | 5/1976 | Spirig |
| 3,974,016 A | 8/1976 | Bondybey et al. |
| 3,975,618 A | 8/1976 | Goos et al. |
| 4,020,232 A | 4/1977 | Kohmura et al. |

(Continued)

FOREIGN PATENT DOCUMENTS

AU 2005-311723 6/2006

(Continued)

OTHER PUBLICATIONS

"Combination Therapies Offer New Management Options for Acne and Rosacea," American Academy of Dermatology—Public Resources, Press Release, New York, NY, Oct. 17, 2001.

(Continued)

*Primary Examiner* — Robert B Davis
(74) *Attorney, Agent, or Firm* — Sughrue Mion, PLLC

(57) ABSTRACT

The invention relates to a method of producing a container from a thermoplastic blank (2), comprising: a step in which the blank (2) is heated using at least one beam (22) of coherent electromagnetic radiation, and a step in which the container is formed from the blank (2) thus heated. The invention also relates to an installation (1) which is used to produce containers (2) and which comprises a unit (16) for heating the blanks (2) in order to form containers from the blanks (2) thus heated. The inventive installation (1) defines a path (23) along which the blanks (2) travel inside the heating unit (16). In addition, the heating unit (16) comprises at least one coherent electromagnetic radiation source (26) which is directed towards a zone (25) that is located on the aforementioned path (23).

72 Claims, 7 Drawing Sheets

U.S. PATENT DOCUMENTS

| | | | |
|---|---|---|---|
| 4,050,887 A | 9/1977 | Berggren et al. | |
| 4,058,699 A | 11/1977 | van Vloten | |
| 4,079,104 A | 3/1978 | Dickson et al. | |
| 4,097,715 A | 6/1978 | Frizzi | |
| 4,135,077 A | 1/1979 | Wills | |
| 4,147,487 A | 4/1979 | Dickson et al. | |
| 4,163,238 A | 7/1979 | Esaki et al. | |
| 4,204,111 A | 5/1980 | Yonko | |
| 4,224,096 A | 9/1980 | Osborne | |
| 4,234,297 A | 11/1980 | Kontz | |
| 4,304,978 A | 12/1981 | Saunders | |
| 4,313,720 A * | 2/1982 | Spurr | 425/526 |
| 4,331,858 A | 5/1982 | Wagner | |
| 4,338,114 A | 7/1982 | Brockway et al. | |
| 4,374,678 A | 2/1983 | Castro | |
| 4,409,455 A | 10/1983 | Belcher et al. | |
| 4,456,811 A | 6/1984 | Hella et al. | |
| 4,459,458 A | 7/1984 | Vetsch et al. | |
| 4,481,405 A | 11/1984 | Malick | |
| 4,486,639 A | 12/1984 | Mittelsteadt | |
| 4,507,538 A | 3/1985 | Brown et al. | |
| 4,606,723 A | 8/1986 | Pasternicki | |
| 4,617,439 A | 10/1986 | Lespinats et al. | |
| 4,665,298 A | 5/1987 | La Rocca | |
| 4,672,169 A | 6/1987 | Chambers | |
| 4,692,583 A | 9/1987 | Kimura et al. | |
| 4,720,480 A | 1/1988 | Ito et al. | |
| 4,754,141 A | 6/1988 | Mindock | |
| 4,810,092 A | 3/1989 | Auth | |
| 4,816,694 A | 3/1989 | Kuppenheimer, Jr. et al. | |
| 4,820,682 A | 4/1989 | Shimomura et al. | |
| 4,820,686 A | 4/1989 | Ito et al. | |
| 4,840,933 A | 6/1989 | Usami et al. | |
| 4,856,978 A | 8/1989 | Voss et al. | |
| 4,857,501 A | 8/1989 | Usami et al. | |
| 4,894,509 A | 1/1990 | Chalco et al. | |
| 4,900,891 A | 2/1990 | Vega et al. | |
| 4,923,847 A | 5/1990 | Ito et al. | |
| 4,924,957 A | 5/1990 | Gigla | |
| 4,929,411 A | 5/1990 | Usami et al. | |
| 4,948,937 A | 8/1990 | Blank et al. | |
| 4,989,791 A | 2/1991 | Ridenour | |
| 4,999,333 A | 3/1991 | Usami et al. | |
| 5,010,231 A | 4/1991 | Huizinga | |
| 5,010,659 A | 4/1991 | Treleven | |
| 5,028,580 A | 7/1991 | Shimomura et al. | |
| 5,066,222 A | 11/1991 | Roos et al. | |
| 5,068,512 A | 11/1991 | Van Geel et al. | |
| 5,110,209 A | 5/1992 | Elshoud et al. | |
| 5,130,292 A | 7/1992 | Ito et al. | |
| 5,146,239 A | 9/1992 | Ono | |
| 5,160,556 A | 11/1992 | Hyde et al. | |
| 5,163,179 A | 11/1992 | Pellegrini | |
| 5,178,990 A | 1/1993 | Satake et al. | |
| 5,206,039 A | 4/1993 | Valyi | |
| 5,208,434 A | 5/1993 | Minamida et al. | |
| 5,246,910 A | 9/1993 | Koshizuka et al. | |
| 5,256,341 A | 10/1993 | Denis et al. | |
| 5,260,258 A | 11/1993 | Ito et al. | |
| 5,260,715 A | 11/1993 | Kishimi | |
| 5,261,415 A | 11/1993 | Dussault | |
| 5,270,285 A | 12/1993 | Ito et al. | |
| 5,308,233 A | 5/1994 | Denis et al. | |
| 5,318,362 A | 6/1994 | Schietinger et al. | |
| 5,322,651 A | 6/1994 | Emmer | |
| 5,349,211 A | 9/1994 | Kato | |
| 5,352,652 A | 10/1994 | Ito et al. | |
| 5,382,441 A | 1/1995 | Lentz et al. | |
| 5,394,492 A | 2/1995 | Hwang | |
| 5,408,488 A | 4/1995 | Kurihara et al. | |
| 5,439,872 A | 8/1995 | Ito et al. | |
| 5,457,299 A | 10/1995 | Blais et al. | |
| 5,501,759 A | 3/1996 | Forman | |
| 5,509,733 A | 4/1996 | Danley | |
| 5,509,796 A * | 4/1996 | Di Settembrini | 425/526 |
| 5,565,119 A | 10/1996 | Behun et al. | |
| 5,589,210 A | 12/1996 | De La Luz Martinez et al. | |
| 5,589,715 A | 12/1996 | Nishitani et al. | |
| 5,618,489 A * | 4/1997 | Weissmann | 264/530 |
| 5,658,667 A | 8/1997 | Yoshida et al. | |
| 5,681,521 A | 10/1997 | Emmer et al. | |
| 5,698,866 A | 12/1997 | Doiron et al. | |
| 5,714,249 A | 2/1998 | Yoshida et al. | |
| 5,740,314 A | 4/1998 | Grimm | |
| 5,741,583 A | 4/1998 | Yoshida | |
| 5,759,200 A | 6/1998 | Azar | |
| 5,773,149 A | 6/1998 | Yoshida et al. | |
| 5,780,524 A | 7/1998 | Olsen | |
| 5,820,820 A | 10/1998 | Pierce | |
| 5,834,313 A | 11/1998 | Lin | |
| 5,865,546 A | 2/1999 | Ganthier et al. | |
| 5,880,710 A | 3/1999 | Jaberi et al. | |
| 5,882,797 A | 3/1999 | Yoshida et al. | |
| 5,883,362 A | 3/1999 | Pettibone et al. | |
| 5,886,313 A | 3/1999 | Krause et al. | |
| 5,888,644 A | 3/1999 | Yoshida et al. | |
| 5,925,710 A | 7/1999 | Wu et al. | |
| 5,935,709 A | 8/1999 | Yoshida | |
| 5,953,356 A | 9/1999 | Botez et al. | |
| 5,975,935 A | 11/1999 | Yamaguchi et al. | |
| 5,976,288 A | 11/1999 | Ekendahl | |
| 5,976,450 A | 11/1999 | Mreijen | |
| 5,980,229 A | 11/1999 | Collombin | |
| 5,985,203 A | 11/1999 | Bowkett | |
| RE36,561 E | 2/2000 | Saito et al. | |
| 6,022,920 A | 2/2000 | Maxwell et al. | |
| 6,038,786 A | 3/2000 | Aisenberg et al. | |
| 6,069,345 A | 5/2000 | Westerberg | |
| 6,080,146 A | 6/2000 | Altshuler et al. | |
| 6,080,353 A * | 6/2000 | Tsuchiya | 264/458 |
| 6,104,604 A | 8/2000 | Anderson et al. | |
| 6,113,837 A | 9/2000 | Erickson | |
| 6,113,840 A | 9/2000 | Emmer et al. | |
| 6,146,677 A | 11/2000 | Moreth | |
| 6,174,388 B1 | 1/2001 | Sikka et al. | |
| 6,174,404 B1 | 1/2001 | Klinger | |
| 6,193,931 B1 | 2/2001 | Lin et al. | |
| 6,246,935 B1 | 6/2001 | Buckley | |
| 6,294,769 B1 | 9/2001 | McCarter | |
| 6,357,504 B1 | 3/2002 | Patel et al. | |
| 6,361,301 B1 * | 3/2002 | Scaglotti et al. | 425/174.4 |
| 6,372,318 B1 | 4/2002 | Collette et al. | |
| 6,387,089 B1 | 5/2002 | Kreindel et al. | |
| 6,417,481 B2 | 7/2002 | Chen et al. | |
| 6,437,292 B1 | 8/2002 | Sikka et al. | |
| 6,441,510 B1 | 8/2002 | Hein et al. | |
| 6,444,946 B1 | 9/2002 | Korte | |
| 6,450,941 B1 | 9/2002 | Larson | |
| 6,451,152 B1 | 9/2002 | Holmes et al. | |
| 6,461,929 B1 | 10/2002 | Löbl et al. | |
| 6,476,345 B1 | 11/2002 | Sator | |
| 6,482,672 B1 | 11/2002 | Hoffman et al. | |
| 6,503,586 B1 | 1/2003 | Wu et al. | |
| 6,507,042 B1 | 1/2003 | Mukai et al. | |
| 6,560,893 B1 | 5/2003 | Bakalar | |
| 6,573,527 B1 | 6/2003 | Sugiyama et al. | |
| 6,617,539 B1 | 9/2003 | Koinuma et al. | |
| 6,621,039 B2 | 9/2003 | Wang et al. | |
| 6,632,087 B1 | 10/2003 | Armellin et al. | |
| 6,638,413 B1 | 10/2003 | Weinberg et al. | |
| 6,667,111 B2 | 12/2003 | Sikka et al. | |
| 6,670,570 B2 | 12/2003 | Giacobbe et al. | |
| 6,710,281 B1 | 3/2004 | Wachnuk | |
| 6,756,697 B2 | 6/2004 | Mizutani et al. | |
| 6,815,206 B2 | 11/2004 | Lin et al. | |
| 6,845,635 B2 | 1/2005 | Watanabe | |
| 6,857,368 B2 | 2/2005 | Pitz | |
| 6,892,927 B2 | 5/2005 | Rumer et al. | |
| 6,905,326 B2 | 6/2005 | Voth et al. | |
| 6,949,217 B2 | 9/2005 | Silverbrook | |
| 6,991,704 B2 | 1/2006 | Broadbent | |
| 7,009,140 B2 | 3/2006 | Partio et al. | |
| 7,015,422 B2 | 3/2006 | Timans | |
| 7,060,942 B2 | 6/2006 | Friedl et al. | |
| 7,063,820 B2 | 6/2006 | Goswami | |
| 7,155,876 B2 | 1/2007 | VanderTuin et al. | |
| 7,220,378 B2 | 5/2007 | Cochran et al. | |

| | | | |
|---|---|---|---|
| 7,307,243 B2 | 12/2007 | Farkas et al. | |
| 7,425,296 B2 | 9/2008 | Cochran et al. | |
| 2001/0019045 A1 | 9/2001 | Chen et al. | |
| 2002/0056707 A1 | 5/2002 | Pinho et al. | |
| 2002/0125234 A1 | 9/2002 | Chen et al. | |
| 2003/0118686 A1 | 6/2003 | Voth et al. | |
| 2004/0010298 A1 | 1/2004 | Altshuler et al. | |
| 2004/0056006 A1 | 3/2004 | Jones et al. | |
| 2004/0161486 A1 | 8/2004 | Pickel | |
| 2004/0231301 A1 | 11/2004 | VanderTuin et al. | |
| 2005/0146065 A1 | 7/2005 | Cochran et al. | |
| 2005/0161866 A1* | 7/2005 | Batlaw et al. | 264/537 |
| 2005/0193690 A1 | 9/2005 | Schoeneck | |
| 2006/0011604 A1 | 1/2006 | Avrard et al. | |
| 2006/0011898 A1 | 1/2006 | Melzig et al. | |
| 2006/0019846 A1 | 1/2006 | Fan et al. | |
| 2006/0048881 A1 | 3/2006 | Evans et al. | |
| 2006/0056673 A1 | 3/2006 | Dehmeshki | |
| 2006/0097417 A1 | 5/2006 | Emmer | |
| 2006/0118983 A1 | 6/2006 | Cochran et al. | |
| 2006/0232674 A1 | 10/2006 | Cochran | |
| 2006/0280825 A1 | 12/2006 | Cochran et al. | |
| 2007/0009635 A1 | 1/2007 | Voisin | |
| 2007/0096352 A1 | 5/2007 | Cochran | |
| 2007/0188023 A1 | 8/2007 | Kraus et al. | |
| 2007/0284788 A1 | 12/2007 | Kurosaki | |
| 2009/0102083 A1 | 4/2009 | Cochran | |
| 2010/0007061 A1 | 1/2010 | Feuilloley et al. | |
| 2010/0127435 A1 | 5/2010 | Feuilloley | |
| 2011/0002677 A1 | 1/2011 | Cochran et al. | |

FOREIGN PATENT DOCUMENTS

| | | |
|---|---|---|
| CA | 2 449 508 A1 | 11/2002 |
| CA | 2 546 517 A1 | 7/2005 |
| DE | 3518204 C1 | 10/1986 |
| DE | 3339613 C2 | 5/1993 |
| DE | 4234342 A1 | 4/1994 |
| DE | 196 03 974 A1 | 8/1997 |
| DE | 197 50 263 A1 | 5/1999 |
| DE | 101 06 607 A1 | 9/2002 |
| DE | 10131620 A1 * | 1/2003 |
| DE | 101 49 934 A1 | 4/2003 |
| DE | 10149934 A1 | 4/2003 |
| EP | 0 564 354 A1 | 10/1993 |
| EP | 0 571 262 A1 | 11/1993 |
| EP | 0 620 099 A1 | 10/1994 |
| EP | 0 680 620 A1 | 11/1995 |
| EP | 0938962 A2 | 9/1999 |
| EP | 0939358 A1 | 9/1999 |
| EP | 1 242 229 B1 | 9/2002 |
| EP | 1 412 684 | 4/2004 |
| FR | 2 561 986 A1 | 10/1985 |
| FR | 2 762 799 A1 | 11/1998 |
| FR | 2 848 906 A1 | 12/2002 |
| FR | 2 872 734 A1 | 7/2004 |
| FR | 2 878 185 A1 | 5/2006 |
| GB | 2095611 A | 10/1982 |
| GB | 2165493 A | 4/1986 |
| GB | 2230740 A | 10/1990 |
| GB | 2324756 A | 11/1998 |
| GB | 2399542 A | 9/2004 |
| JP | 57-80030 A | 5/1982 |
| JP | 59-184626 A | 10/1984 |
| KP | 2007-0097033 | 10/2007 |
| MX | 2007-006611 A | 7/2007 |
| WO | 95/14251 A1 | 5/1995 |
| WO | 98/42050 A1 | 9/1998 |
| WO | 00/27576 A1 | 5/2000 |
| WO | 01/39959 A1 | 6/2001 |
| WO | 01/98870 A2 | 12/2001 |
| WO | 02/095382 A1 | 11/2002 |
| WO | 03-002922 A1 | 1/2003 |
| WO | 2004-009318 A1 | 1/2004 |
| WO | 2004/030857 A1 | 4/2004 |
| WO | 2005/065917 A1 | 7/2005 |
| WO | 2005-067591 | 7/2005 |
| WO | 2005/068161 A1 | 7/2005 |
| WO | 2005/123367 A1 | 12/2005 |
| WO | 2006/010694 A1 | 2/2006 |
| WO | 2006/045926 A1 | 5/2006 |
| WO | 2006/056573 A1 | 6/2006 |
| WO | 2006/056673 A1 | 6/2006 |
| WO | 2006/060690 A2 | 6/2006 |
| WO | 2006/069261 A2 | 6/2006 |
| WO | 2007/149221 | 12/2007 |
| WO | 2008/154503 | 12/2008 |

OTHER PUBLICATIONS

"Diode Array for Wheel Alignment," CorkOpt Ltd., Date not available.

"Infrared Heat for Glass Processing," Heraeus Noblelight, Aug. 2001.

"Intense Pulsed Light," www.yestheyrefake.net/intense_pulsed_light.htm, Aug. 6, 2003.

"Lasers Offer New Medical and Cosmetic Treatment Options for Patients with Skin of Color," American Academy of Dermatology—Public Resources, Press Release, Chicago, IL, Jul. 27, 2003.

"Low Energy Photon (LEPT)—Light Emitting Diode (LED)—Light Therapy," Allied Light Therapy, www.alliedlighttherapy.com/page1.html., Mar. 3, 2004.

"MID-IR LEDS—1.6 µm . . . 5.0 µm" www.roithner-laser.com/LED_MID_IR.htm., Aug. 4, 2004.

"Rosacea: Pulse-Light Treatments Get the Red Out," UT-Houston—Health Leader, www.uthouston.edu/hLeader/archive/skinhealth/010927/index.html, Mar. 3, 2004.

"Skin Contact Monochromatic Infrared Energy: Technique to Treat Cutaneous Ulcers, Diabetic Neuropathy and Miscellaneous Musculoskeletal Conditions," Blue Cross of California, Medical Policy 2.01.22, Jun. 25, 2003.

Alaiti, S., et al. "Tacrolimus (FK506) ointment for atopic dermatitis: A phase I study in adults and children," Journal of the American Academy of Dermatology, 38 (1), pp. 69-76, Jan. 1998.

Feldman, S.R., et al. "Destructive Procedures are the Standard of Care for Treatment of Actinic Keratoses," Journal of the American Academy of Dermatology, 40 (1), pp. 43-47, Jan. 1999.

Fleischer, A.B., et al., "Procedures for Skin Diseases Performed by Physicians in 1993 and 1994: Analysis of data from the National Ambulatory Medical Care Survey," Journal of the American Academy of Dermatology, Part 1, 37 (5), pp. 719-724, Nov. 1997.

Friedlander, S.F., et al., "Severe and Extensive Atopic Dermatitis in Children as Young as 3 Months," Journal of the American Academy of Dermatology. 46 (3), pp. 387-393, Mar. 2002.

Goings, J. & E. Stephens, "Microchannel cooling ups power capacity for laser-diode bars," Laser Focus World, May 1, 2006.

Gold, M.H. "A Single Center, Open Label Investigator Study of Photodynamic Therapy in the Treatment of Sebaceous Gland Hyperplasia with Topical 20% 5-Aminolevulinic Acid with Visible Blue Light or Intense Pulsed Light," Journal of the American Academy of Dermatology, Abstract P638, Part 2, 50 (3), p. P164, Mar. 2004.

Goyal, A.K., et al., "Wavelength Beam Combining of Mid-IR Semiconductor Lasers," Lasers and Electro-Optics Society, The 14th Annual Meeting of the IEEE, WQ3 2:15pm-2:30pm, pp. 532-533, 2001.

Hanifin, J.M., et al. "Thcrolimus Ointment for the Treatment of Atopic Dermatitis in Adult Patients: Part I, Efficacy." Journal of the American Academy of Dermatology. Jan. 2001, part 2, vol. 44, No. 1, pp. S28-S38.

Hecker, D., et al., "Interactions between tazarotene and ultraviolet light," Journal of the American Academy of Dermatology, 41 (6), pp. 927-930, Dec. 1999.

Ivey, A., et al., "Medical Issue: Laser Treatement of Rosacea," Google Answers, May 6, 2003.

Janis, M.D., "On Courts Herding Cats: Contending with the "Written Description" Requirement (and Other Unruly Patent Disclosure Doctrines)," Re-Engineering Patent Law, vol. 2:55, pp. 55-108, 2000.

Jeffes, E.W., et al., "Photodynamic therapy of actinic keratoses with topical aminolevulinic acid hydrochloride and fluorescent blue light," Journal of the American Academy of Dermatology, Abstract, Part 1, 45 (1), Jul. 2001.

Lebwohl, M., et al., "Interactions between calcipotriene and ultraviolet light." Journal of the American Academy of Dermatology, 37 (1), pp. 93-95, Jul. 1997.

Mallozzi, J., "Thin-Disk Lasers Position Themselves in Industry," R&D Magazine, pp. 21-23, Apr. 2005.

Morton, C.A., et al., "The Efficacy of Violet Light in the Treatment of Acne," Journal of the American Academy of Dermatology, Abstract P638, Part 2, 50 (3), p. P15, Mar. 2004.

Nestor, M.S., "Combination Phototherapy and Adapalene in the Treatment of Acne Vulgaris," Journal of the American Academy of Dermatology, Abstract P664, Part 2, 50 (3), p. P170, Mar. 2004.

Paller, A., et al., "A 12-Week Study of Tacrolimus Ointment for the Treatment of Atopic Dermatitis in Pediatric Patients," Journal of the American Academy of Dermatology, 44 (1), pp. S47-S57, Jan. 2001.

Rattunde, M., et al., "Power efficiency of GaSb based 2.0μm diode Lasers," Lasers and Electro-Otics Society, The 14th Annual Meeting of the IEEE, WQ2 2:00pm-2:15pm, pp. 530-531, 2001.

Soter, N. A., et al., "Tacrolimus ointment for the treatment of atopic dermatitis in adult patients: Part II, Safety," Journal of the American Academy of Dermatology, 44 (1), pp. S39-S46, Jan. 2001.

Tanzi, E.L., et al., "Lasers in dermatology: Four decades of progress," Journal of the American Academy of Dermatology, Abstract, Part 1, 49 (1), Jul. 2003.

Thomson Hybrides, "Saut Technologique Pour Une Nouvelle Structure de Diodes Laser de Puissance," Du Cote de la Rue Descartes, pp. 12-13. (Date not available).

Wagner, J. "Diode Lasers for High-Power Applications at 2 pm," Fraunhofer IAF, Achievement and Results, pp. 24-25, 2001.

Wiese, A., "Potential Savings for Preform Heating by Using NIR Technology," PETnology Europe 2007 Conference Presentation, Mar. 26, 2007.

Wolfe, W.L. & G.J. Zissis, Eds., "The Infrared Handbook: revised edition" Environmental Research Institute of Michigan, pp. 5-56-5-57, 1989.

Woodcock, J., Letter to M. Macdonald, D.A. Jaskot and J.F. Hurst re ANDA from Department of Health & Human Services, Center for Drug Evaluation and Research, Jun. 11, 2002.

Zanolli, M., "Phototherapy treatment of psoriasis today," Journal of the American Academy of Dermatology, Abstract, Part 2, 49 (2), Aug. 2003.

Nagasaka, K., et al., "Micro-bonding laser chips using arrayed beams," SPIE Newsroom, Micro/Nano Lithography & Fabrication, Jul. 24, 2008.

PerkinElmer, "Superior Chip-on-Board Technology for the most demanding LED applications," www.optoelectronics.perkinelmer.com, 2006.

* cited by examiner

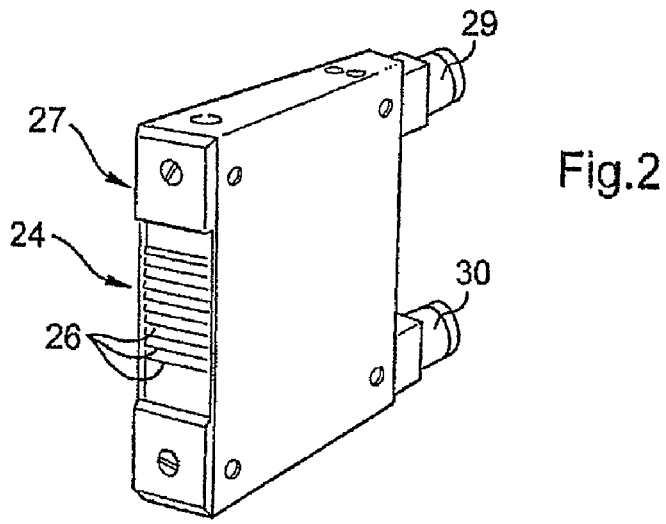
Fig.2
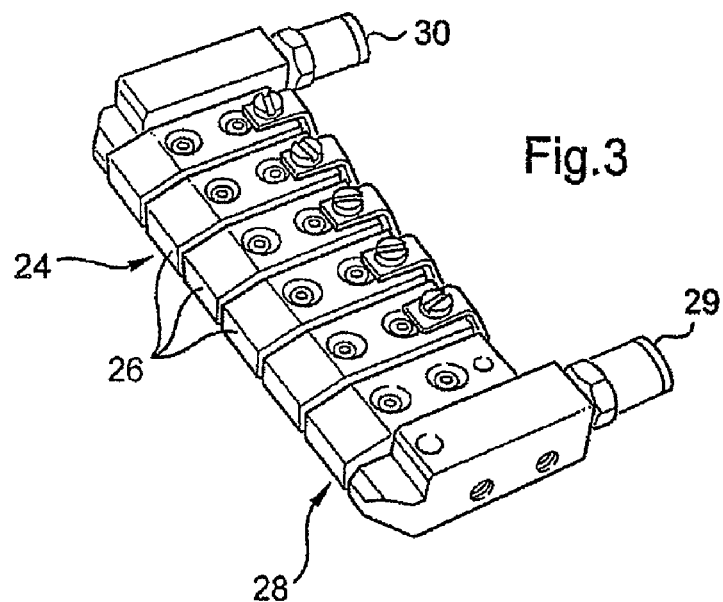
Fig.3
Fig.4
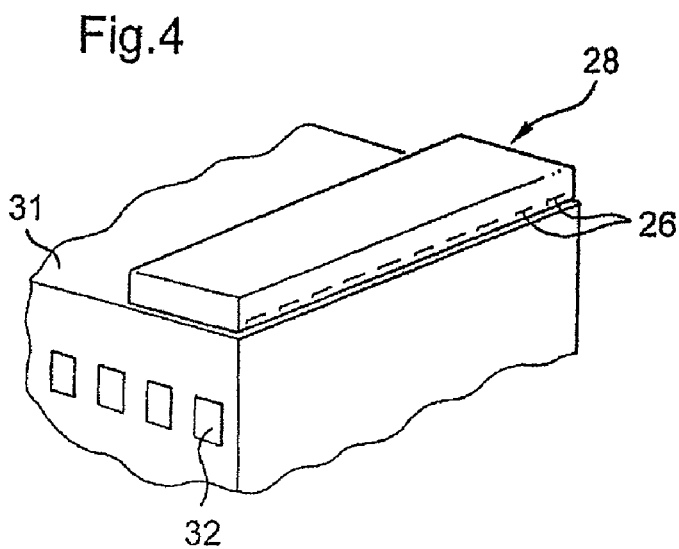

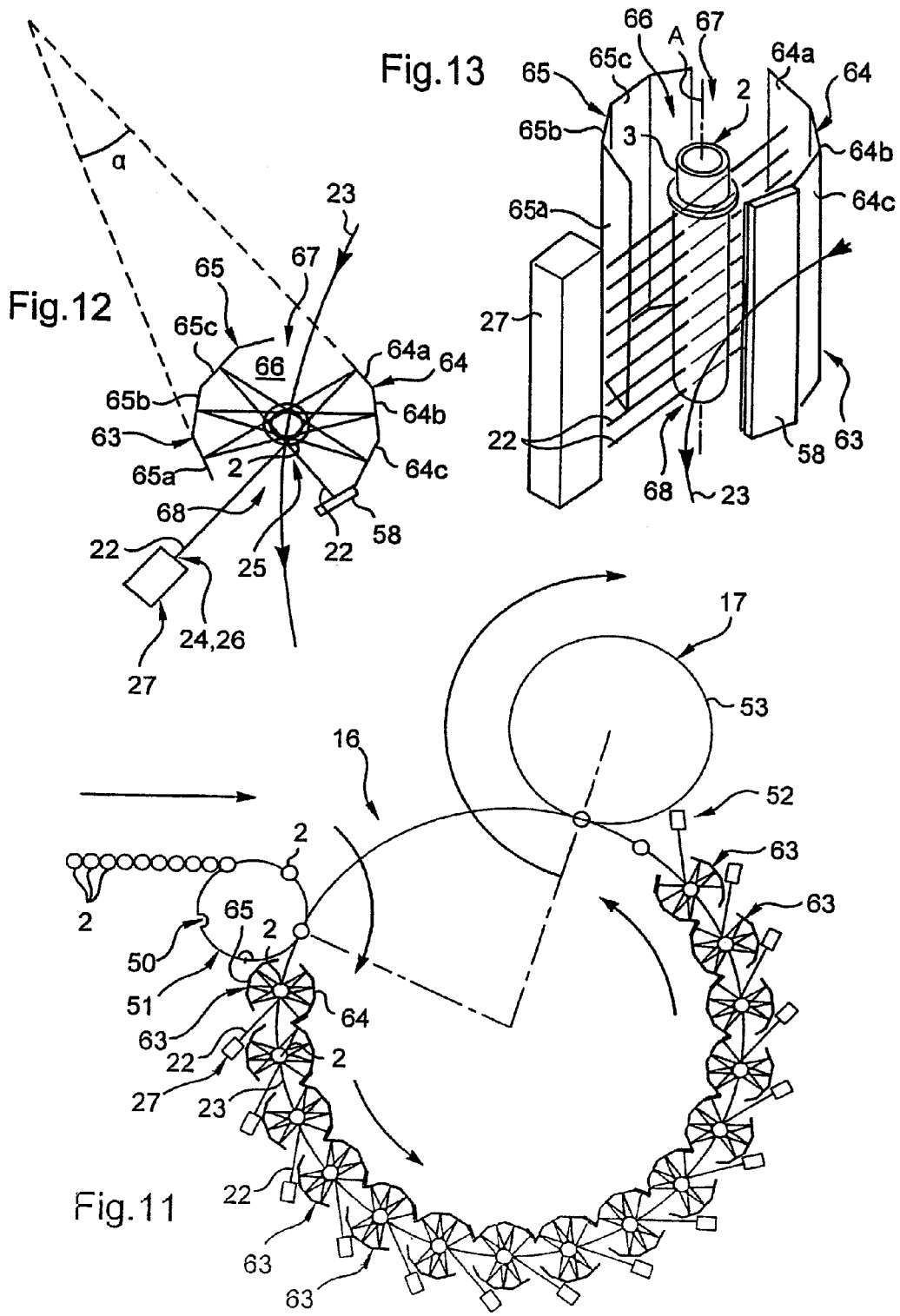

US 8,354,051 B2

METHOD AND INSTALLATION FOR THE PRODUCTION OF CONTAINERS

CROSS REFERENCE TO RELATED APPLICATIONS

This is a continuation application of application Ser. No. 11/667,958 filed Jul. 16, 2007, which is a 371 National Stage Application of PCT Application No. PCT/FR2005/002826 filed Nov. 15, 2005, which claims foreign priority to FR 04 12372, filed on Nov. 22, 2004. The entire disclosure of application numbers U.S. Ser. No. 11/667,958, PCT/FR2005/002826, and FR 04 12372 are hereby incorporated by reference.

TECHNICAL FIELD

The invention relates to the production of containers.

It relates more particularly to a method and an installation for producing containers—especially bottles—from thermoplastic parisons.

BACKGROUND ART

Such a method involves a first step during which the parisons are heated, within an appropriate heating unit, then a second step during which the parisons are introduced, hot, into a multiple-mold blow-molding or stretch-blow-molding unit where they are shaped into containers.

On leaving the blow-molding or stretch-blow-molding unit, the containers thus formed will be directed either toward a storage unit to await subsequent filling or directly toward a filling unit.

Let us remember that a container parison comprises a neck, intended to take the closure that seals the container that is to come and which is already at its final dimensions, extended by a body, the shaping of which will lead to the actual container proper.

The heating of the parisons is generally performed within an oven equipped with an array of tubular halogen lamps past which the parisons progress, while being rotated on themselves. More specifically, an oven contains several elementary modules, each containing several lamps, each of the lamps being controlled individually so that, ultimately, on leaving the oven, the temperature of the body of each of the parisons is above the glass transition temperature of their constituent material and a heating profile is obtained on each parison, which profile is predetermined such that the distribution of material is optimized in the container that is to be obtained.

This method of heating does have a certain number of disadvantages.

First, its energy efficiency (that is to say the ratio of the power absorbed by the parisons to the power consumed by the lamps) is extremely low, of the order of 11 to 15%. This is because of the spatial diffusion of the radiation emitted by the lamps, only a fraction of which reaches the body of the parisons. The low value displayed by this efficiency has a negative impact on production rates.

Next, the heating profile (that is to say the plot of temperatures measured along the length of the parison) cannot be obtained precisely; given the diffusion effect, the radiation from the lamps interferes with each other which means that seeking precisely to regulate the intensity of the combined radiation at a given distance from the lamps is an extremely fanciful notion.

In order to alleviate this disadvantage, there has already been the idea to make the parisons file past the lamps at the closest possible range. However, this then gives rise to an undesirable problem of overheating at the surface of the parisons, which phenomenon cannot be lessened unless an expensive ventilation system is fitted and operated.

Furthermore, there is also a significant phenomenon of thermal convection whereby the ascending air streams transfer some of the emitted radiation to the capital part of the parison. Now, the neck of this parison needs to be kept at a modest temperature so that it maintains its original dimensions.

Hence, in order to limit the incident heating of the neck by thermal convection, it has become judicious to orient the parisons neck down. As such a precaution proved to be insufficient in certain instances, it was combined with ventilation of the neck. Whatever the case, this orientation of the parisons entails, on entering the heating unit, an operation of inverting the preforms, because the preforms are generally introduced into the oven neck up, and also an operation of inverting either the preforms before they are introduced into the mold when the stretch-blow-molding step is performed neck up (which is the more common scenario), or of the containers as they leave the installation so that they can be stored or filled. These inverting operations entail installing and operating appropriate devices which make the installation more complicated and have a negative impact on cost.

SUMMARY OF THE INVENTION

In order in particular to alleviate the aforementioned disadvantages, the method according to the invention for producing a container from a thermoplastic parison involves:

a step of heating the parison performed by means of at least one beam of coherent electromagnetic radiation, then a step of forming the container from the parison thus heated.

The invention also proposes an installation for producing containers from thermoplastic parisons, which comprises a heating unit for heating the parisons with a view to forming the containers from the parisons thus heated. The installation defines a path that the parisons are intended to follow within the heating unit, which comprises at least one source of coherent electromagnetic radiation directed toward a region situated on the path of the parisons.

The radiation can thus be concentrated on to a localized part of the parison, making it possible to obtain a temperature profile close to a predetermined profile, the almost-total absence of diffusion and thermal convection allowing the parison to be heated while it is oriented neck up without this neck experiencing incident heating liable to alter its dimensions.

More specifically, the beam of electromagnetic radiation (such as a laser emitted for example by a laser diode) is preferably directed toward the body of the parison. The radiation is preferably emitted in the near infrared, in other words at a wavelength ranging between about 700 nm and 1600 nm.

The heating of the parison is preferably performed by means of a plurality of adjacent and/or superposed beams of electromagnetic radiation. In practice, heating may be performed by means of a plurality of juxtaposed and/or superposed laser diodes, for example, in the form of one or more arrays.

The or each beam may be linear or planar; it is, for example, directed in a predetermined overall direction, while the parison, at least locally is made to follow a path either substantially perpendicular or substantially parallel to the direction of the beam.

In the heating step, the parison is preferably rotated about a predetermined axis, for example, an axis that coincides with an axis of revolution of the parison, so as to obtain uniform heating around the circumference of this parison.

Furthermore, the neck of the parison may be ventilated in order to remove the overflow of hot air.

According to one embodiment, in the heating step, the beam is reflected at least once off a reflective surface.

The heating unit comprises, for example, a chamber comprising a first wall and a second wall facing one another and substantially parallel to the path of the parisons, these walls being positioned one on each side of this path and together delimiting an internal volume, the first wall being equipped with a plurality of superposed parallel slits facing each of which there is positioned, on the opposite side to the internal volume, a row of radiation sources.

According to one embodiment, the second wall at least has, on the same side as the internal volume, a reflective internal surface.

In order to ventilate the neck of the parison, the heating unit may comprise a ventilation system able to generate an air flow passing through a region situated vertically in line with said chamber.

According to an embodiment variant, the installation comprises two successive heating units of this type.

According to another embodiment, with the path of the parisons being substantially circular, the heating unit comprises a plurality of successive chambers positioned along the path, each chamber having two cylindrical walls facing each other and positioned one on each side of the path and together defining an internal cavity, each wall having several adjacent reflective facets facing toward the cavity, the source of electromagnetic radiation being directed toward one of these facets.

The heating unit, for example comprises an opaque screen adjacent to one of the facets, to absorb the beam after it has been reflected several times off the facets.

Whatever the embodiment adopted, the heating unit preferably comprises means for rotating the parisons about their axis of revolution.

BRIEF DESCRIPTION OF THE DRAWINGS

Other objects and advantages of the invention will emerge from the description given hereinafter with reference to the attached drawings in which:

FIGS. 2 and 3 are perspective views of a block and of an array of laser diodes which may be chosen to equip an installation according to the invention;

FIG. 4 is a schematic perspective view showing the internal structure of an array of laser diodes;

FIG. 11 is a schematic plan view, from above, illustrating the heating unit for an installation for producing containers according to a third embodiment;

FIG. 12 is a plan view, from above, on a larger scale, of a detail of the heating unit depicted in FIG. 11; and FIG. 13 is a view illustrating, in perspective, the detail depicted in FIG. 12.

DESCRIPTION OF THE PREFERRED EMBODIMENT

Figure 1:
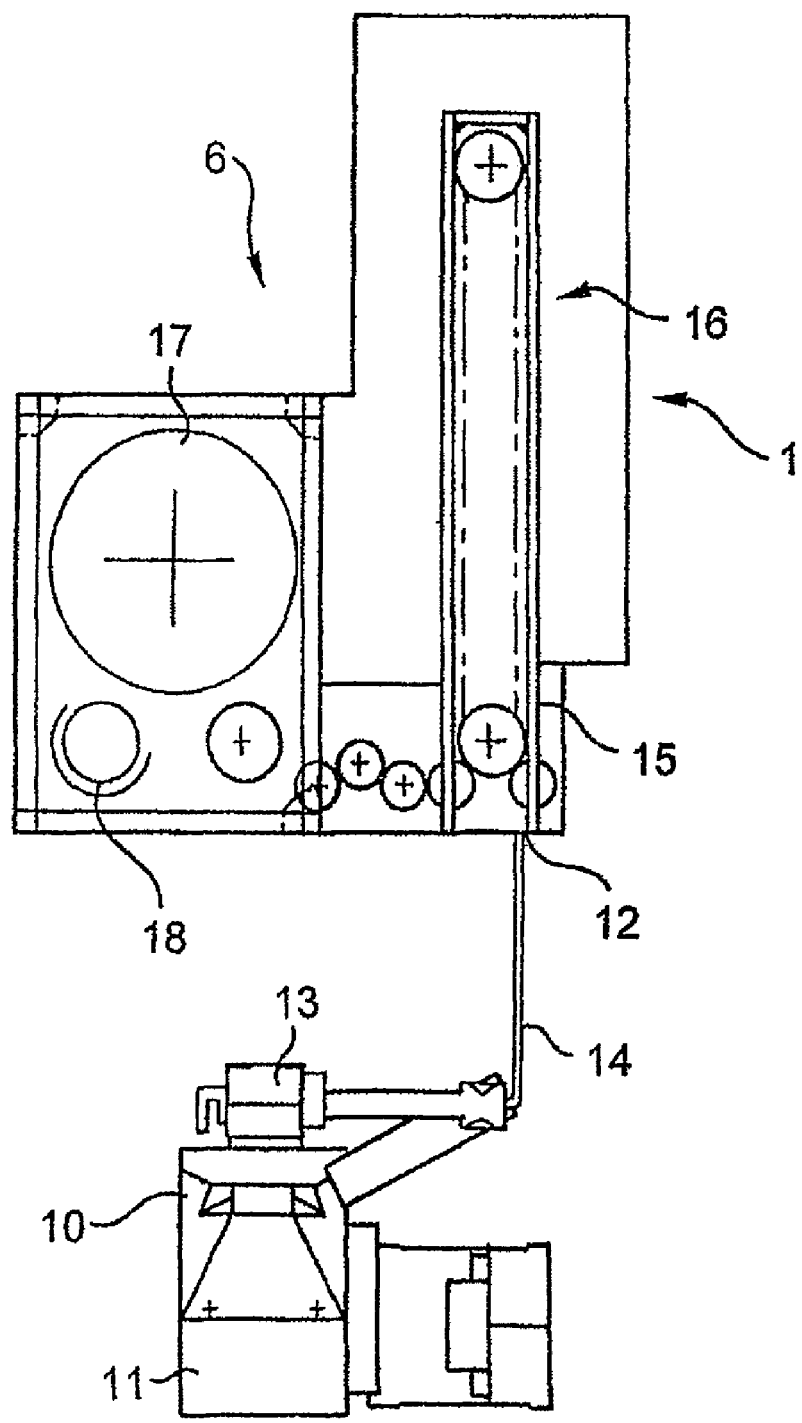
FIG. 1 is a schematic view of an installation for producing containers from thermoplastic parisons.

FIG. 1 depicts an installation 1 for producing containers, such as bottles, from parisons 2, in this instance preforms, made of thermoplastic. It is recalled here that the term "parison" covers not only a preform, but also any intermediate part between the preform and the finished container. Some methods actually involve two successive shaping steps, namely a first step of forming an intermediate container from the preform then, after a certain time has elapsed, a second step of forming the finished container from the intermediate container.

Figure 8:
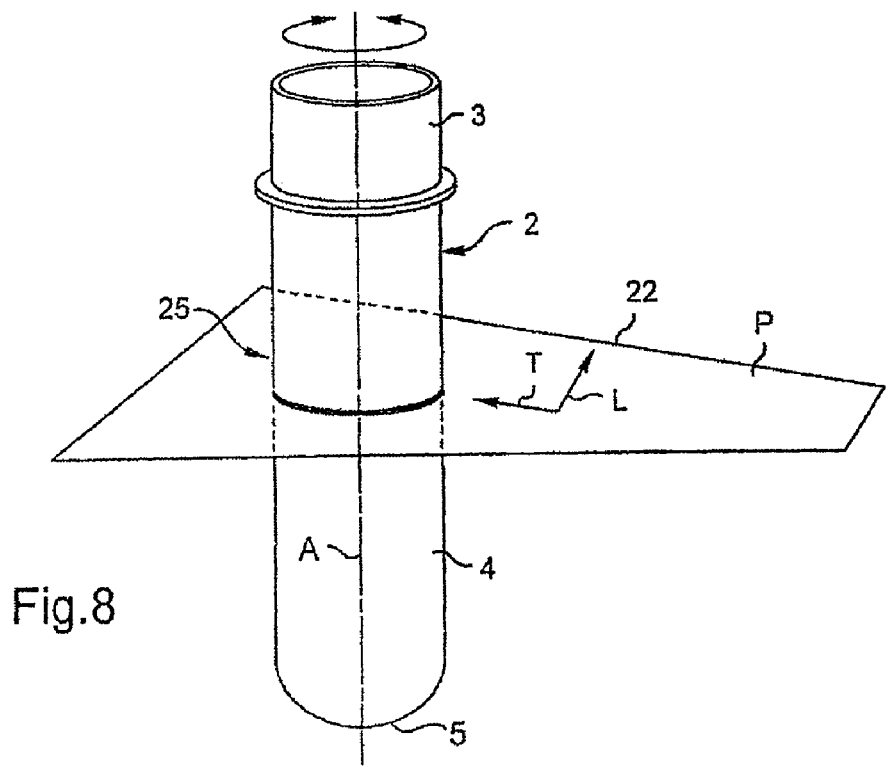
FIG. 8 is a schematic perspective view showing a container parison exposed to a laser beam in a heating unit as depicted in FIG. 7.

A parison 2 in the form of a preform is depicted on a large scale in FIG. 8. It is a molded component in the form of a test specimen exhibiting symmetry of revolution about an axis A and having a neck 3 intended, as far as possible, not to undergo any deformation during the forming of the container, and a body 4 ending in a bottom 5 and intended to be heated and then shaped. Without implying any limitation to such an application, it is assumed in the remainder of the description that the containers are formed directly from preforms, which means that, for the sake of convenience, this term will be used arbitrarily to denote parisons or preforms.

The containers are, for example, made of polyethylene terephthalate (PET), of polyethylene naphthalate (PEN), or another appropriate thermoplastic.

As depicted in FIG. 1, the installation 1 comprises a feed unit 10 which supplies the preforms 2 to a forming unit 6. The feed unit 10 comprises, for example, a hopper 11 into which the preforms 2, produced beforehand by molding, are loaded loose, this hopper 11 being connected to an inlet 12 of the forming unit 6 by a sorting machine 13 which isolates and positions the preforms 2 (which are cold, that is to say at ambient temperature) on a slide 14.

The preforms 2 are then mounted on a transfer line 15 then heated, as they pass through a heating unit 16, before being introduced hot into a blow-molding unit 17 (or stretch-blow-molding unit) of the multiple-mold carousel type.

The containers are then transferred, by means of a conveyer 18, such as a wheel with cavities, from the molds of the blow-molding unit 17 to an outlet of the forming unit 6.

Within the heating unit 16, the preforms 2 are heated by means of at least one beam 22 of coherent electromagnetic radiation.

For this, the installation 1 defines, within the heating unit 16, a predetermined path 23 that the preforms 2 follow during the heating step. More specifically, this path 23 is defined by a conveyer (not depicted) equipped with links articulated to one another and from which the preforms 2 are suspended. This driving technique is well known to those skilled in the art and will not be described in detail; let us nonetheless specify that each link comprises attachment means in the form of a hanger, known as a "spinner" in the terms of the art, which fits into or on to the neck 3 of the preform 2, this hanger having a pinion-shaped part which meshes with a fixed rack running alongside the line, so that as the line advances, the hangers, with their preforms are rotated.

The heating unit 16 comprises at least one source 24 of coherent electromagnetic radiation directed toward a target region 25 situated on the path 23 of the preforms 2, and through which these pass, as we shall see later.

The description which follows first of all sets out the choice of the source 24 of electromagnetic radiation for heating the preforms (§1), and then, describes the heating unit 16 and the corresponding heating method, in three exemplary embodiments (§2).

1. Choice of the Source of Electromagnetic Radiation

Tests have shown that, across the light spectrum, the radiation that is of use for heating a thermoplastic such as a PET (the material from which container preforms for the most common applications are conventionally made) lies in the field of the near infrared, that is to say at wavelengths ranging between 700 nm and 1600 nm.

Several lasers available on the market have proved satisfactory in application to the heating of thermoplastics (the tests conducted by the inventors were conducted using a PET).

A PET preform generally has a wall thickness ranging between 1 mm and 3 mm, entirely dependent on the type of container that is to be obtained.

A first test was conducted by the inventors on PET test specimens 3 mm thick using three laser sources emitting in the near infrared, namely:
 1. first of all, a laser of the Nd:YAG type (this type of laser comprises a neodymium-doped yttrium aluminum garnet amplifier with a power of 4.4 kW, generating an infrared beam with a wavelength of 1064 nm,
 2. secondly, a laser diode of the hybrid type, with a power of 3 kW, generating an infrared beam combining two wavelengths of 808 nm and 940 nm respectively, and
 3. thirdly, a laser diode with a power of 500 W generating an infrared beam with a wavelength of 808 nm.

Figure 5:
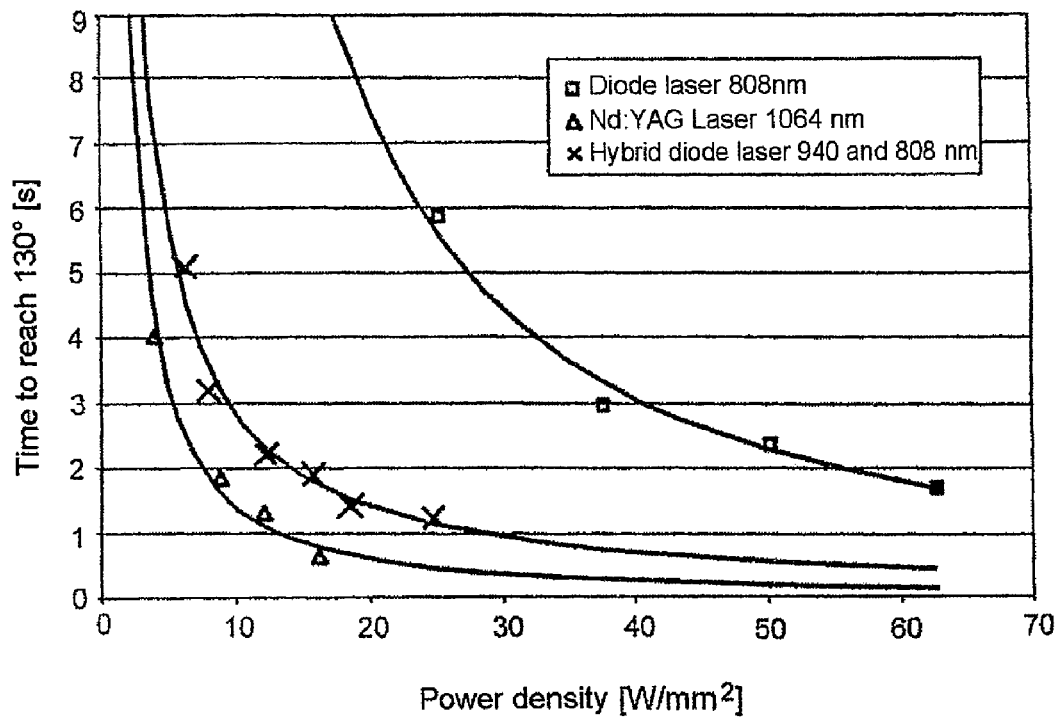
FIG. 5 is a diagram illustrating the compared efficiency of three different laser sources for heating a PET.

The diagram in FIG. 5 shows, for each of these lasers, the plot of the time taken for the material to reach the core temperature of 130° C. (this is in fact the temperature to which PET preforms need to be heated), as a function of the transmitted power density.

It can be seen that, while the efficiency of the Nd:YAG laser seems to be superior to that of the diode lasers, the plots are, nonetheless, similar, which shows that the laser can be chosen on the basis of parameters other than efficiency alone, particularly on the basis of the shape of the beam, the size of the source and, of course, its cost.

Furthermore, it has been found that the choice of laser is also dependent on the need to safeguard the material from uncontrolled crystallization. A compromise is therefore needed. Although the Nd:YAG has proven its efficiency, the diode laser will take preference over it, being less expensive and less bulky, for an imperceptible difference in efficiency in the application to the heating of thermoplastic preforms.

While tests have shown that the domain adopted for the radiation is that of the near infrared, they have also shown that, before 1000 nm, the choice in wavelength has little impact on the heating quality ("heating quality" is to be understood as meaning heating which not only gives a lower exposure time, but also gives good accuracy and good diffusion of the radiation through the thickness of the material).

By contrast, for the same wavelength, the following parameters: beam shape, energy profile, power density, have an important effect on the heating quality.

As we shall see hereinafter, the first exemplary embodiment uses a planar beam 22, generated by a laser diode 26 to which a spreading lens is added. Various manufacturers offer laser diodes which either come individually or assembled into arrays as depicted in FIGS. 2 and 3.

FIG. 2 depicts a block 27 of stacked diodes 26 with a total power of 1200 W, marketed by Thales, under the references TH-C17xx-M1 or TH-C55xx-M1. Each diode 26 generates a planar laser beam so that the block generates several superposed planar beams which may be parallel or divergent.

FIG. 3 depicts an array 28 of diodes 26 with a power of 40 W each, each diode 26 generating a planar beam. The array 28 thus generates a planar beam, formed by the juxtaposition of the beams generated by all the diodes. An array of this type is marketed by Thales, under the references TH-C1840-P or TH-C1841-R.

As can be seen in FIGS. 2 and 3, the block 27 and the array 28 are both equipped with an internal water-cooling circuit, the water inlet 29 and outlet 30 pipes of which can be seen in the figures.

FIG. 4 schematically depicts the structure of an array 28 of diodes 26. The diodes 26 are jointly mounted and soldered onto a support 31 equipped with ducts 32 perpendicular to the beams 22 and through which the cooling fluid runs.

2. Producing the Heating Unit

The heating unit is now described in greater detail according to three distinct exemplary embodiments with reference to FIGS. 6 to 11.

2.1 EXAMPLE 1

The first exemplary embodiment is described with reference to FIGS. 6 to 8.

Figure 6:
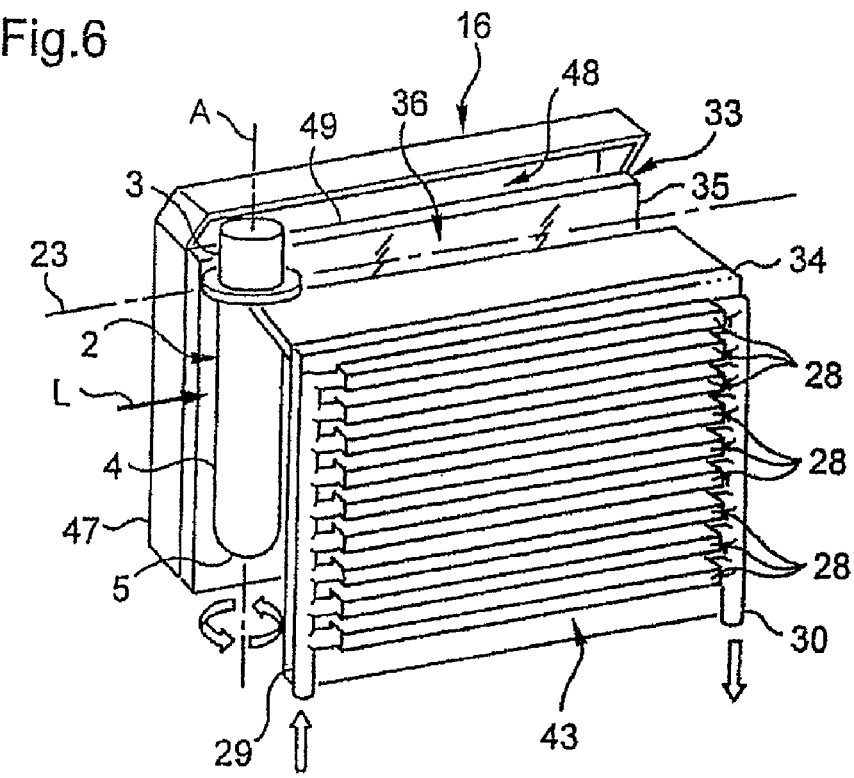
FIG. 6 is a schematic perspective view illustrating a heating unit for an installation for producing containers according to a first embodiment.

As can be seen in FIG. 6, the path 23, represented by a chain line, that the preforms 2 follow within the heating unit 16 is substantially rectilinear and defines a direction L termed the longitudinal direction.

In this example, the heating unit 16 comprises a chamber 33 comprising a first wall and a second wall 34, 35 which are vertical and face one another and run substantially parallel to the path 23, being positioned one on each side thereof.

The walls 34, 35 together delimit an internal volume 36 through which the preforms 2 pass longitudinally.

Figure 7:
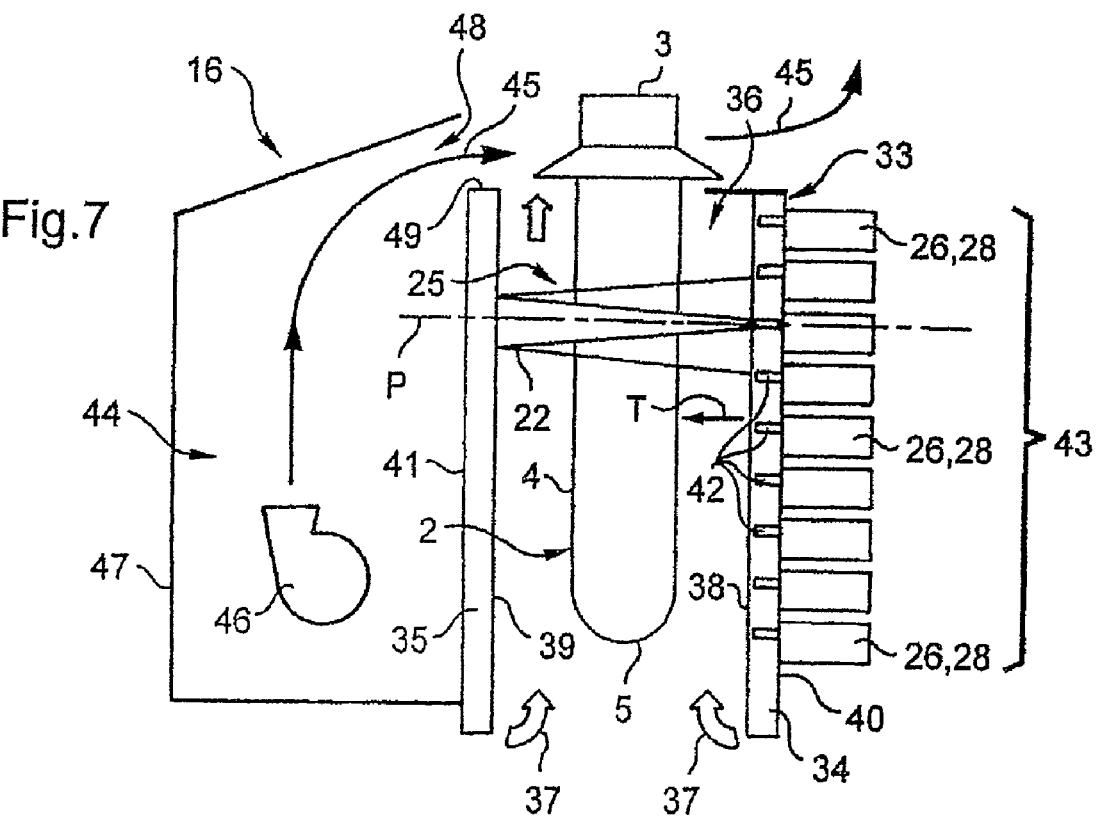
FIG. 7 is an elevation in cross section illustrating the heating unit of FIG. 6.

As can be seen in FIG. 7, the walls 34, 35 extend over a height substantially equal to the length of the body 4 of the preform 2. This preform is oriented neck up, the neck 3 protruding out of the chamber 33 above the walls 34, 35. The chamber 33 is open at the bottom to allow an ascending air flow 37 to circulate to provide the chamber 33 with a certain degree of ventilation in order to remove the heat emitted by the body 4 of the heated parison 2.

Each wall 34, 35 has a respective internal face 38, 39 facing toward the internal volume 36 and a respective opposite external face 40, 41.

The first wall 34 is equipped with a plurality of superposed horizontal parallel slits 42 facing each of which there is positioned, on the external face 40 side, an array 28 of laser diodes, as described hereinabove.

As can be seen in FIG. 6, the heating unit thus comprises a matrix 43 of laser diodes formed by a plurality of superposed arrays 28, which runs substantially facing the entire height of the body 4 of the preforms 2. The arrays 28 may be cooled by means of their own circuits, which are connected to a common cooling liquid supply 29 and discharge 30 duct.

Each diode emits a beam 22 oriented in an overall direction T that is transverse to the path 23, and runs in a horizontal mid-plane P parallel to this path 23.

Each slit 42 subjects the beam 22 passing through it to a diffusion effect which means that the beam 22 has a tendency to diverge on each side of the horizontal midplane P.

Furthermore, the internal faces 38, 39 of the walls 34, are reflective which means that the beam 22 undergoes several successive reflections and therefore crosses the preform 2 several times before it loses its energy. This results in an improvement in the energy efficiency and in a reduction in the time taken to heat the preforms 2.

To produce the matrix 43 of diodes, it is possible to use several superposed arrays 28 of 40 W diodes of the type explained hereinabove (cf. §1) and illustrated in FIG. 3.

In FIG. 7, the angle of divergence of the beam 22 is exaggerated in order to demonstrate this dual phenomenon of divergence and reflection.

Rotating the preform 2 about its axis A makes it possible, on leaving the heating unit, to obtain a temperature profile that is substantially constant around the circumference of the body 4.

Furthermore, it is possible to regulate the power of the diodes 26 in such a way as to obtain the desired temperature profile which is non-uniform over the length of the preform 2, for example, with a view ultimately to obtaining a container of curved shape. In such an example, the middle arrays 28 will be set to a lower power than the lower and upper arrays 28 so as to keep the central part of the body 4 at a temperature that is lower (for example at around 115° C.) than the temperature of its end parts (which will be raised to around 130° C.)

Although the phenomenon of thermal convection in the chamber 33 is limited because of the use of coherent radiation, particularly so that the neck 3 does not experience any heating liable to soften it and cause an alteration to its dimensions during the blowing (which, as has been stated, allows the preforms 2 to be oriented neck up), it may prove preferable to ventilate at least the upper part of the chamber 33, so as to create a cool air flow around the neck 3.

Hence, as has been depicted in FIG. 7, the heating unit 16 is equipped with a ventilation system 44 generating an air flow 45 which, vertically in line with the chamber 33, circulates transversely in order to remove the heat energy drained away by the upward air flow 37 due to natural thermal convection. This ventilation system 44 for example comprises a fan 46 arranged in a casing 47 positioned on the external face 41 side of the second wall 35 and having an opening 48 extending vertically in line with an upper edge 49 of the wall 35, able to route the air flow 37 from the fan 46 transversely.

Each preform 2 is heated as follows.

The preform 2 originating from the feed unit 10 enters the heating unit 16 along the longitudinal path 23 locally defined by the conveyer.

The preform 2 is rotated about its axis A. The laser beams 22 emitted by the diodes 26 strike it along the entire path that it follows through the chamber 33. Initially at ambient temperature, the body 4 of the preform 2 is quickly raised to a temperature of around 120° C., while its neck 3 is kept at ambient temperature.

On leaving the chamber 33, the preform 2 is transferred to the stretch-blow-molding unit 18 to be shaped into a container.

2.2 EXAMPLE 2

The second exemplary embodiment is now described with reference to FIGS. 9 and 10. This second example comprises a first embodiment illustrated in FIG. 9, whereby the installation 1 comprises a single heating unit 16, and a second embodiment which, illustrated in FIG. 10, constitutes a variant of the first in that the installation 1 comprises two successive heating units 16.

According to the first embodiment, the path 23 followed by the preforms 2 within the heating unit 16 is locally rectilinear, in a longitudinal direction L, between an upstream transfer region 50 where the cold preforms 2 are brought into the heating unit 16 by an upstream transfer wheel 51, and a downstream transfer region 52, where the hot preforms 2 are removed from the heating unit 16 by a downstream transfer wheel 53.

The heating unit 16 comprises several superposed laser sources 24 positioned at a downstream end of the path 23, along the axis thereof. The sources 24 here consist of collimating lenses 54 each connected by an optical fiber 55, to a diode laser generator 56 and together form a vertical block 57 of a height substantially equal to the bodies 4 of the preforms 2.

Figure 9:
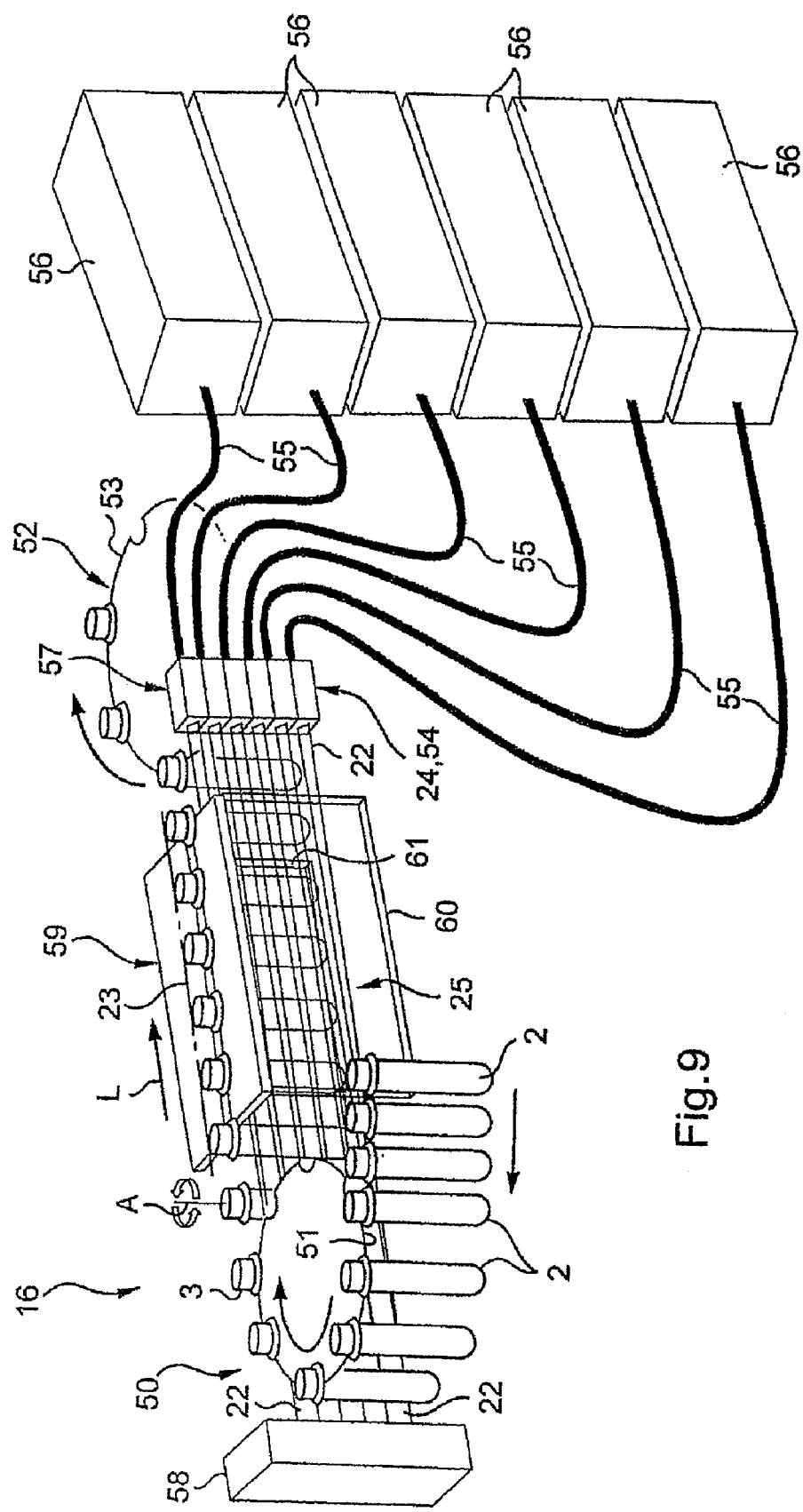
FIG. 9 is a schematic perspective view illustrating a heating unit for an installation for producing containers according to a second embodiment.

As can be seen in FIG. 9, the lenses 54 are oriented in such a way as to generate longitudinal (linear or planar) beams 22 which strike the preforms 2 in succession before encountering an opaque screen 58 forming an energy sink, positioned transversely in the continuation of the path 23, beyond the upstream transfer wheel 51.

Thus, along the path 23, each preform 2 is progressively heated by the laser beams 22 whose energy, transferred successively to the preforms 2 that they strike and pass through is, first of all, from the point of view of the preform, low at the exit of the upstream transfer wheel 51, then increases as the preform 2 gradually nears the sources 24 before reaching a maximum in the vicinity of these sources before the preform 2 is taken up by the downstream transfer wheel 53.

It is thus possible to heat the preforms 2 gradually using only a block of laser sources, rather than a matrix as explained in the first example described above.

However, in order to avoid excessively rapid dissipation of the energy of the laser beams, it is preferable to use laser diodes of a higher power. Thus, the laser adopted here is a diode laser of the type set out hereinabove (cf. §1), with an individual power of 500 W.

As illustrated in FIG. 9, the heating unit 16 comprises a confinement chamber 59 comprising two walls 60, 61 facing each other and positioned one on each side of the path 23, between the upstream 51 and downstream 53 transfer wheels.

These walls 60, 61 have reflective internal faces which confine the laser beams 22 by reflecting their transverse components resulting from the diffraction through the preforms 2. Thus energy losses are limited while at the same time improving the safety of the installation.

Although this is not shown in FIG. 9, the heating unit 16 may be equipped with a ventilation system similar to the one described hereinabove in the first exemplary embodiment.

According to the second embodiment, the installation 1 comprises two heating units 16, similar to the heating unit 16 described hereinabove in the first embodiment and positioned in succession in the path of the preforms 2, namely a first heating unit 16a designed to raise the preforms 2 to an intermediate temperature (that is to say to a temperature between ambient temperature, which corresponds to the initial temperature of the preforms, around 20° C., and the final temperature, prior to forming, of around 120° C.), and a second heating unit 16b designed to raise the preforms 2 to their final temperature (of around 120° C.)

The path 23a followed by the preforms 2 within the first heating unit 16a is locally rectilinear, in a longitudinal direction L between an upstream transfer region 51 where the cold preforms 2 are supplied to the first heating unit 16a by an upstream transfer wheel 51, and an intermediate transfer region 62 where the warm preforms 2 are transferred from the first heating unit 16a to the second 16b.

Figure 10:
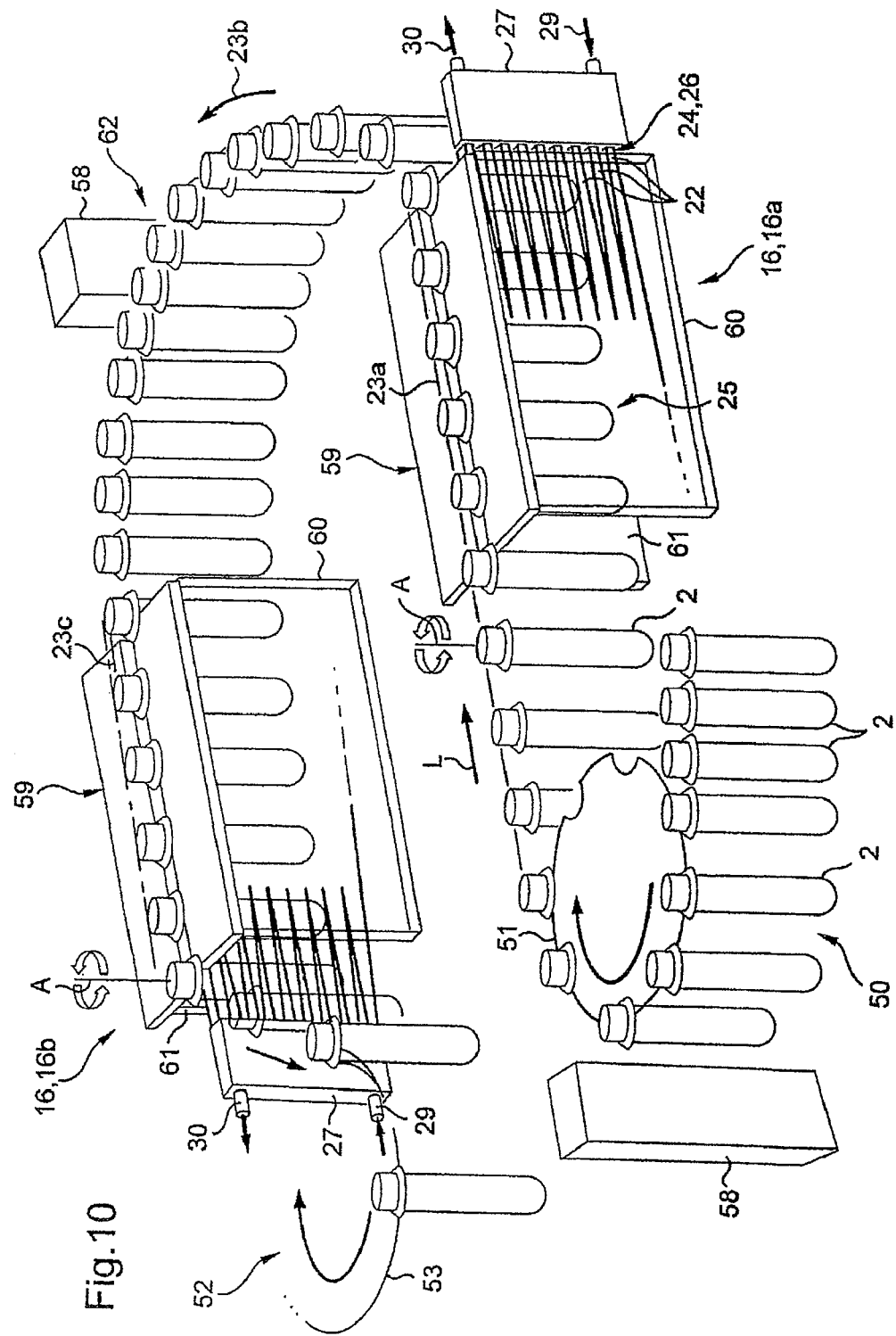
FIG. 10 is a schematic perspective view similar to FIG. 9 also illustrating a heating unit according to a variant of the second embodiment.

In the example depicted in FIG. 10, the heating units 16a, 16b are arranged parallel to one another, and the path 23b followed by the preforms in the intermediate transfer region 62 is curved. This arrangement makes it possible to avoid interference between the beams 22 of the first heating unit 16a and those of the second 16b.

The path 23c followed by the preforms 2 within the second heating unit 16b is, also, locally rectilinear and longitudinal, between the intermediate transfer region 62 and a downstream transfer region 52 where the hot preforms 2 are taken up transversely by a downstream transfer wheel 53.

Each heating unit 16a, 16b comprises a block 27 of superposed laser diodes of a height substantially equal to that of the bodies 4 of the preforms 2 and arranged at a downstream end of the corresponding path 23a, 23c along the axis thereof.

The blocks 27 of diodes are, for example, of the kind set out hereinabove (cf. §1) and illustrated in FIG. 2.

As can be seen in FIG. 10, the first heating unit 16a comprises an opaque screen 58 forming an energy sink, that the laser beams 22 strike once they have passed in succession through the preforms 2 present on the path 23a, and which is positioned transversely in the continuation of the path 23a beyond the upstream transfer wheel 51.

The second heating unit 16b also comprises such an opaque screen 58, for its part positioned in the continuation of the path 23c, on the same side as the intermediate transfer region 62.

Furthermore, as can be seen in FIG. 10, each heating unit 16a, 16b comprises a confinement chamber 59 of which the reflective walls 60, 61, positioned one on each side of the corresponding path 23a, 23c, prevent the lateral dispersion of the laser beams 22.

Thus, the preforms 2 are first of all raised to an intermediate temperature, for example of around 80° C., within the first heating unit 16a, and then, from there, are raised to a final temperature of about 120° C. within the second heating unit 16b before being transferred to the stretch-blow-molding unit 18.

It should be noted that for particular applications, more than two heating units could be envisioned.

2.3 EXAMPLE 3

The third exemplary embodiment is now described with reference to FIGS. 11 to 13.

In this example, the path 23 of the parisons 2 within the heating unit 16 is substantially circular and, as can be seen in FIG. 11, the heating unit 16 comprises a plurality of adjacent chambers 63 arranged along the path 23 and through which the preforms 2 pass in succession.

The path 23 is defined between an upstream transfer wheel 51 which brings the preforms 2 from the feed unit 10, and a downstream transfer wheel 53 carrying the stretch-blow-molding molds.

Each chamber 63 has two cylindrical walls facing each other, namely an internal wall 64 and an external wall 65, positioned one on each side of the path 23, and together defining an internal cavity 66 in which the preform 2 is positioned, its axis A therefore being temporarily coincident with an axis of symmetry of the chamber 63.

Each wall 64, 65 has several adjacent reflective facets 64a, 64b, 64c, 65a, 65b, 65c facing toward the cavity 66, each facet 64a, 64b, 64c of one wall 64 being positioned facing a corresponding facet 65a, 65b, 65c of the wall 65 opposite, these facets 64a, 64b, 64c, 65a, 65b, 65c not being exactly parallel with their pair but together defining an angle α of a few degrees, as can be seen in FIG. 12.

An upstream gap 67 and a downstream gap 68 are defined between the walls 64, 65, through which gaps 67, 68 each preform 2 in turn enters and then leaves.

Furthermore, the heating unit 16 comprises, for each chamber 63, an opaque screen 58 adjacent to one facet 64c of the internal wall 64, on the same side as the downstream gap 68.

For each chamber 63, the heating unit 16 comprises a block 27 of stacked laser diodes positioned facing one 64a of the facets of the internal wall 64, bordering the upstream gap 67. The laser diodes, directed toward this facet 64a are designed each to generate a beam 22 that is either linear or contained in a vertical plane that is transverse with respect to the path 23 of the preforms 2, the beam 22 making an acute angle with the normal to the facet 64a (FIG. 12).

Thus, each beam 22 undergoes several successive reflections off the facets 64a, 65a, 64b, 65b, 64c, 65c before striking the screen 58 which, as it forms an energy sink, completely absorbs the beam 22 (FIG. 12).

When a preform 2 is positioned at the center of the chamber 63, neck up, each beam 22 thus strikes it several times in distinct regions distributed at its circumference, as can be seen in FIG. 12.

As is apparent from FIG. 11, each preform 2 passes in succession through all the chambers 63 and the diodes can be set in such a way that their power increases along the path 23, the temperature of the preforms 2 therefore increasing as they gradually progress through the heating unit 16.

As before, the preforms 2 may be rotated about their axis of revolution A, their progress within the heating unit 16 preferably being stepwise, each preform 2 for example remaining in each chamber 63 for a fraction of a second.

It is perfectly conceivable for the progress of the preforms through the heating unit 16 to be continuous, because of the good ability that the laser beams have to penetrate through the material of which the bodies of the preforms are made.

Of course, irrespective of the embodiment adopted, it is possible to regulate the speed at which the preforms 2 travel through the heating unit.

In fact, the various settings (rate of travel, power of diodes, length of chamber) will be chosen by the person skilled in the art according to the material to be used for the preforms, and the machine rates dictated by production.

As we have seen, the method and the installation described hereinabove allow parisons, such as preforms, to be heated both more quickly and more precisely than can be achieved by the known methods and installations.

This speed means that the size of the heating unit can be limited, while tests have shown it is possible, using coherent electromagnetic beams, to achieve energy efficiencies of 50%, something which seemed unthinkable with the known methods and installations.

Tests have in fact demonstrated a laser energy penetration into the materials commonly used in this application, that is superior to that of the radiation of the halogen lamps conventionally employed for heating, thus improving the uniformity of the temperature of the material through the thickness of the preform.

The precision of the heating makes it possible to obtain a vertical heating profile which more precisely matches the desired profile. More specifically, this precision makes it possible to achieve heating profiles which hitherto were impossible to obtain. That in particular means that the design of the preforms can be revised so that the weight (which in practice means the wall thickness) of the preforms can be distributed differently according to the desired temperature profile for a particular profile of the container.

Furthermore, the small amount of heating of the ambient air additionally means that the preforms can be kept in the neck up orientation throughout the container production process, thus avoiding inverting operations.

The invention claimed is:

1. A method of thermally treating thermoplastic parisons for use in blow molding operations, the method comprising the steps of:
transporting a series of parisons through a path of a heating unit of a blow molding machine, wherein each of the parisons has a neck and the heating unit is configured to heat the parisons while the parisons are oriented neck up in the heating unit;
irradiating the parisons using one or more sources of coherent electromagnetic radiation at one or more wavelengths in a wavelength band between 700 nm and 1600 nm; and
heating the parisons to at least one desired temperature,
wherein the path is defined by opposing a first wall and a second wall which comprises:
slits disposed on a side of the second wall proximate the path, and
the sources of coherent electromagnetic radiation which are disposed on other side of the second wall, distally from the path, and emit the coherent electromagnetic radiation through the slits across the path toward the first wall and across substantially an entire length of a body of each parison which follows the path.

2. The method as claimed in claim 1, wherein said source of coherent electromagnetic radiation is an infrared-emitting device.

3. The method as claimed in claim 1, wherein said source of coherent electromagnetic radiation is an infrared-emitting laser.

4. The method as claimed in claim 1, wherein said source of coherent electromagnetic radiation is a near infrared-emitting device.

5. The method as claimed in claim 1, wherein said source of coherent electromagnetic radiation is a near infrared-emitting laser.

6. The method as claimed in claim 1, wherein said source of coherent electromagnetic radiation is a near infrared-emitting laser diode.

7. The method as claimed in claim 1, wherein the one or more wavelengths are selected to increase the energy absorbed by the parisons.

8. The method as claimed in claim 1, wherein the one or more wavelengths are selected for efficiently heating the parisons.

9. The method as claimed in claim 1, wherein the one or more wavelengths are selected to reduce the exposure time required to heat the parisons to a desired temperature.

10. The method as claimed in claim 1, wherein the one or more wavelengths are selected to achieve a desired amount of energy absorbed by the parisons for a given power density.

11. The method as claimed in claim 1, wherein the one or more wavelengths are selected to achieve a desired heating quality of the parisons.

12. The method as claimed in claim 1, wherein the one or more wavelengths are selected to achieve good diffusion of the radiant energy through the at least one predetermined thickness of the parisons.

13. The method as claimed in claim 1, wherein the method comprises heating at least one section of the parisons to a temperature of about 80° C.

14. The method as claimed in claim 1, wherein the method comprises heating at least one section of the parisons to a temperature of about 115° C.

15. The method as claimed in claim 1, wherein the method comprises heating at least one section of the parisons to a temperature of about 120° C.

16. The method as claimed in claim 1, wherein the method comprises heating at least one section of the parisons to a temperature of about 130° C.

17. The method as claimed in claim 1, wherein the method comprises a first step of heating at least one section of the parisons to a temperature of about 80° C. and a second step of heating at least one section of the parisons to a temperature of about 130° C.

18. The method as claimed in claim 1, wherein the method comprises a first step of heating at least one section of the parisons to a temperature of about 120° C. and a second step of heating at least one section of the parisons to a temperature of about 130° C.

19. The method as claimed in claim 18, wherein the first step and the second step are performed in different heating units of the blow molding machine.

20. The method as claimed in claim 1, wherein the parisons have at least one wall section having a thickness between 1 mm and 3 mm.

21. The method as claimed in claim 1, wherein the parison has a non-uniform wall thickness, in which the weight of the thermoplastic material is distributed according to a desired temperature profile for producing a particular profile of a container to be produced from the parison.

22. The method as claimed in claim 1, wherein at least two sections of the parisons are heated to different temperatures.

23. The method as claimed in claim 1, wherein at least three sections of the parisons are heated to different temperatures.

24. The method as claimed in claim 22 or 23, wherein the step of heating the parisons produces a non-uniform temperature profile over the length of the parisons.

25. The method as claimed in claim 22 or 23, wherein the step of heating the parisons produces a non-uniform vertical heating profile of the parisons.

26. The method as claimed in claim 23, wherein a middle section of the parison is heated to a temperature that is lower than the temperature to which two end sections of the parison are heated.

27. The method as claimed in claim 23, wherein the middle section of the parison is heated to a temperature of about 115° C. and the two end sections are heated to a temperature of about 130° C.

28. The method as claimed in claim 7 or 8, wherein the energy efficiency of the method is greater than 15%.

29. The method as claimed in claim 7 or 8, wherein the energy efficiency of the method is from greater than 15% to 50%.

30. The method as claimed in claim 10, further comprising heating said parisons for less than about 6 minutes at a power density of about 25 W/mm2.

31. The method as claimed in claim 10, further comprising heating said parisons for less than about 3 minutes at a power density of about 40 W/mm2.

32. The method as claimed in claim 10, further comprising heating said parisons for less than about 2.5 minutes at a power density of about 50 W/mm2.

33. The method as claimed in claim 10, further comprising heating said parisons for less than about 2 minutes at a power density of about 55 W/mm2.

34. The method as claimed in claim 10, further comprising heating said parisons for less than about 3 minutes at a power density of about 10 W/mm2.

35. The method as claimed in claim 10, further comprising heating said parisons for less than about 1.5 minutes at a power density of about 20 W/mm2.

36. The method as claimed in claim 10, further comprising heating said parisons for less than about 1 minute at a power density of about 30 W/mm2.

37. The method as claimed in claim 11, comprising selecting one or more of selecting beam shape, energy profile and power density to increase heating quality.

38. The method as claimed in claim 1, wherein the heating step is performed at a power adapted to prevent uncontrolled crystallization of the thermoplastic material.

39. The method as claimed in claim 1, wherein the thermoplastic parisons comprise polyethylene terephthalate (PET).

40. The method as claimed in claim 1, wherein the thermoplastic parisons comprise polyethylene naphthalate (PEN).

41. The method as claimed in claim 38, wherein the source of coherent electromagnetic radiation comprises at least one laser diode.

42. The method as claimed in claim 38, wherein the source of coherent electromagnetic radiation comprises at least one near infrared laser diode emitting radiation at a wavelength of 808 nm.

43. The method as claimed in claim 38, wherein the source of coherent electromagnetic radiation comprises at least two near infrared laser diodes emitting radiation at wavelengths of 808 nm and 940 nm.

44. The method as claimed in claim 1, wherein the heating step is conducted in the absence of broader wavelength heating radiation.

45. The method as claimed in claim 1, wherein the one or more wavelengths are selected to provide good diffusion through the thickness of the thermoplastic material.

46. The method as claimed in claim 1, wherein the one or more wavelengths are selected to provide uniform diffusion through the thickness of the thermoplastic material.

47. The method as claimed in claim 1, further comprising regulating the power of selected diodes to attain a desired temperature profile of the parisons.

48. The method as claimed in claim 1, further comprising regulating the power of at least one array of diodes to attain a desired temperature profile of the parisons.

49. The method as claimed in claim 1, further comprising regulating the power of separate arrays of diodes to attain a desired non-uniform temperature profile of the parisons.

50. The method as claimed in claim 1, wherein the near infrared laser diode heating elements are operative to emit radiant energy within a wavelength range between 700 and 1064 nm.

51. The method as claimed in claim 1, wherein the near infrared laser diode heating elements are operative to emit radiant energy within a wavelength range between 700 and 940 nm.

52. The method as claimed in claim 1, wherein the near infrared laser diode heating elements are operative to emit radiant energy within a wavelength range between 700 and 808 nm.

53. The method as claimed in claim 1, wherein the near infrared laser diode heating elements are operative to emit radiant energy within a wavelength range between 808 and 1600 nm.

54. The method as claimed in claim 1, wherein the near infrared laser diode heating elements are operative to emit radiant energy within a wavelength range between 808 and before 1000 nm.

55. The method as claimed in claim 1, wherein the near infrared laser diode heating elements are operative to emit radiant energy within a wavelength range between 808 and 1064 nm.

56. The method as claimed in claim 1, wherein the near infrared laser diode heating elements are operative to emit radiant energy within a wavelength range between 808 and 940 nm.

57. The method as claimed in claim 1, wherein the near infrared laser diode heating elements are operative to emit radiant energy within a wavelength range between 940 and 1600 nm.

58. The method as claimed in claim 1, wherein the near infrared laser diode heating elements are operative to emit radiant energy within a wavelength range between 940 and before 1000 nm.

59. The method as claimed in claim 1, wherein the near infrared laser diode heating elements are operative to emit radiant energy within a wavelength range between 940 and 1064 nm.

60. The method as claimed in claim 1, wherein the near infrared laser diode heating elements are operative to emit radiant energy within a wavelength range between 1000 and 1600 nm.

61. The method as claimed in claim 1, wherein the near infrared laser diode heating elements are operative to emit radiant energy within a wavelength range between 1000 and 1064 nm.

62. The method as claimed in claim 1, wherein the near infrared laser diode heating elements are operative to emit radiant energy within a wavelength range between 1064 and 1600 nm.

63. The method as claimed in claim 1, wherein the near infrared laser diode heating elements are operative to emit radiant energy within at least one wavelength of 808 nm, 940 nm, and 1064 nm.

64. The method as claimed in claim 1, wherein the near infrared laser diode heating elements are operative to emit radiant energy within at least two wavelengths of 808 nm, 940 nm, and 1064 nm.

65. The method as claimed in claim 1, wherein the near infrared laser diode heating elements are operative to emit radiant energy at two wavelengths of 808 nm and 940 nm.

66. The method as claimed in claim 1, wherein the near infrared laser diode heating elements are operative to emit radiant energy at a wavelength of 808 nm.

67. The method as claimed in claim 1, wherein the near infrared laser diode heating elements are operative to emit radiant energy at a wavelength of 940 nm.

68. The method as claimed in claim 1, wherein the near infrared laser diode heating elements are operative to emit radiant energy at a wavelength of 1064 nm.

69. The method as claimed in claim 1, wherein the near infrared laser diodes are operative to emit radiant energy at a wavelength of 1064 nm.

70. The method as claimed in claim 1, wherein the near infrared laser diode heating elements are operative to emit radiant energy within a wavelength range between 700 and 1600 nm.

71. The method as claimed in claim 1, wherein the near infrared laser diode heating elements are operative to emit radiant energy within a wavelength range between 700 and before 1000 nm.

72. The method as claimed in claim 1, wherein the transporting comprises:
   transporting the series of parisons through the path by retaining the bodies of the parisons between and within the first and second walls and projecting the necks of the parisons above the first and second walls, during the irradiating of the parisons.

* * * * *